United States Patent
Ronnen

(10) Patent No.: US 6,239,699 B1
(45) Date of Patent: May 29, 2001

(54) INTELLIGENT ALARM FILTERING IN A TELECOMMUNICATIONS NETWORK

(75) Inventor: U. George Ronnen, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/261,808

(22) Filed: Mar. 3, 1999

(51) Int. Cl.[7] .............................. G08B 23/00; H04M 1/24
(52) U.S. Cl. .................... 340/517; 340/825.16; 340/507; 340/511; 379/1; 379/2; 379/26; 370/242; 455/423; 455/67.1
(58) Field of Search ..................................... 340/517, 511, 340/507, 825.16, 506, 519; 455/423, 9, 67.1; 379/1, 2, 26; 359/110; 370/241, 242

(56) References Cited

U.S. PATENT DOCUMENTS

| | | | |
|---|---|---|---|
| 5,309,448 | * | 5/1994 | Bouloutas et al. ................... 371/29.1 |
| 5,465,321 | * | 11/1995 | Smyth ..................................... 395/22 |
| 5,734,697 | * | 3/1998 | Jabbarnezhad ......................... 379/32 |
| 5,771,274 | * | 6/1998 | Harris ..................................... 379/26 |
| 5,864,662 | * | 1/1999 | Brownmiller et al. ......... 395/183.19 |
| 5,913,036 | * | 6/1999 | Brownmiller et al. ............... 370/241 |
| 5,923,247 | * | 7/1999 | Dowden et al. ...................... 340/506 |
| 6,012,152 | * | 1/2000 | Douik et al. ............................ 714/26 |
| 6,078,649 | * | 6/2000 | Small et al. ............................ 379/39 |

OTHER PUBLICATIONS

Intelligent Alarm Filtering for Sonet, Bellcore Document No. SR–TSV–002672, Issue 1, Mar. 4, 1994, pp. 2–1 through 2–4 and 3–1 through 3–6.

* cited by examiner

Primary Examiner—Donnie L. Crosland
(74) Attorney, Agent, or Firm—Thomas J. Bean; Gregory J. Murgia

(57) ABSTRACT

Redundant alarm messages generated by a plurality of Network Elements (NEs) in a Synchronous Optical Network (SONET) or Synchronous Digital Hierarchy (SDH) subnetwork are suppressed by a filter incorporated within a Subnetwork Controller (SBNC). In an illustrative embodiment of the invention, the SBNC filter collects and logs all alarm messages reported by the subnetwork NEs during a correlation period. After the period is completed, the filter determines whether at least one alarm that was reported during the period directly indicates a failure within the subnetwork and, if so, suppresses all other alarms arriving during the period that indicate conditions symptomatic of this failure. The correlation period persists for no longer than a maximum specified time period, and only so long as alarm messages continue to be reported during the interval.

21 Claims, 9 Drawing Sheets

INTELLIGENT ALARM FILTERING IN A TELECOMMUNICATIONS NETWORK

FIELD OF THE INVENTION

This invention relates to telecommunications networks. More particularly, this invention relates to the network management of Synchronous Optical Network (SONET) and Synchronous Digital Hierarchy (SDH) networks.

BACKGROUND OF THE INVENTION

Synchronous Optical Network (SONET) and Synchronous Digital Hierarchy (SDH) networks have been broadly deployed by telecommunications service providers to provide the broadband infrastructure needed for many advanced telecommunications services. In addition to providing exceptionally high transmission rates in excess of 10 gigabits per second, SONET and SDH networks provide sophisticated performance monitoring and network control capabilities.

By way of example, FIG. 1 illustrates some of the major components in a typical SONET network. A SONET network 100 comprises two subnetworks 110, 120 and a network surveillance manager (NSM) 130. Each subnetwork includes a set of interconnected network elements that are each connected to a single subnetwork controller (for example, a subnetwork 110 includes a series of interconnected network elements (NEs) 112-1 through 112-n that are each connected to a subnetwork controller (SBNC) 116. SBNCs 116, 126 work in conjunction with the NSM 130 to monitor and control the NEs 112, 122.

One significant tool for SONET subnetwork maintenance is alarm monitoring. A substantial number of alarms are generated by NEs in response to a variety of detected conditions. Many of these alarms may reflect short duration transient conditions, anticipated maintenance actions (such as the installation of new equipment), or maintenance conditions detected and reported elsewhere. Such alarms have limited relevance for the purposes of monitoring subnetwork maintenance conditions.

A variety of filtering techniques have been used in the prior art to eliminate irrelevant alarms. For example, one technique employs "aging" to reduce the number of forwarded alarms. Using this method, alarms are stored at an associated SBNC for a pre-defined "aging period" before being reported. If an alarm is cleared during this period, it is suppressed.

A second technique used in the prior art is "alarm throttling." Using this technique, each NE is allowed to send at maximum a pre-defined number of alarm messages to the SBNC during a specified time period (for example, 100 alarm messages over a five minute period). All additional alarms produced during the period are suppressed.

A third technique employed in the prior art is "Access Identifier (AID) correlation." Using this technique, multiple alarms generated at the same SONET termination port (AID point) are suppressed so that only the highest severity alarm at the AID point is reported.

While each of these strategies can significantly reduce the number of forwarded alarm messages, each does so by creating some risk. For example, a risk is incurred in alarm throttling applications that a significant alarm will be discarded if it follows a period during which many symptomatic alarms were reported. Additionally, each of these techniques may be ineffective for eliminating irrelevant alarms under some conditions.

For example, a failure condition may be detected by a NE and reported as an autonomous message to an associated SBNC. In addition, the NE may alert other NE's to the condition it has detected. In turn, these NEs will send autonomous messages about this condition to their associated SBNCs. Because NE's may be alerted across a number of subnetwork boundaries, associated SBNC's and NSMs may be flooded by alarm messages produced by these NEs. Most of the messages sent are effectively "symptomatic," as they do not directly stem from the failure of interest. Notably, these symptomatic messages provide no additional maintenance-assisting information beyond that provided by the first autonomous message sent by the affected NE.

To address these shortcomings, another strategy has been proposed (see Intelligent Alarm Filtering for SONET, Bellcore Document No. SR-TSV-002672, Issue 1, Mar. 4, 1994). This scheme is illustrated in FIG. 1, where alarm filters 118, 128 are incorporated within SBNCs 116, 126 respectively. According to this Intelligent Alarm Filtering (IAF) scheme, all alarms generated by the NEs are reported to their associated SBNCs. Two classes of failures appear at the SBNCs. Directly Detected Failure Conditions (DDFCs) are considered directly indicative of a failure in the subnetwork. DDFCs indicate equipment failures (failures occurring within a NE) and facility failures (failures associated with facilities that interconnect NEs including, for example, loss of signal, loss of frame, out of frame, loss of pointer, signal label mismatch, automatic protection switching, data communications channel, and synchronization failures). In contrast, Symptomatic Conditions (SCs) are merely symptomatic indications of troubles detected at a reporting NE or at other NEs (for example, as indicated by alarm indication signal, remote failure indication, performance monitoring threshold crossing alert and successful protection switching completion alarms).

According to the Bellcore IAF requirements, each SBNC logs all autonomous messages received from NEs in the subnetwork, and reports all messages indicating a DDFC to the NSM. All messages reporting SCs that can be explained by a reported DDFC must be filtered out and not reported to the NSM. Messages associated with non-explainable SCs continue to be reported to the NSM.

Because SONET and SDH subnetworks incorporate a large number of multiplexed communications paths, in order to determine whether SCs are explainable or non-explainable, a SBNC must be able to specifically and directly trace the path between a SC message and a DDFC message in order to establish any correlation. Tracing requires realtime knowledge both about the interconnections of NEs in the subnetwork as well as provisioned cross-connections within the individual NEs. In SONET and SDH subnetworks of current proportion, a single DDFC message can generate thousands of SC messages. Thus, the potential magnitude of SC messages makes such direct tracing of correlated alarm messages prohibitive. Therefore, an improved method is desired for filtering redundant SC messages without directly tracing each SC to an associated DDFC.

Although correlated alarms may be generated almost simultaneously in affected NE's, alarm messages can be received by an associated SBNC over a widely varying time period (often referred to as the "alarm storm"). Alarms may be effectively correlated only if examined over a time period sufficient to ensure that all related alarms have been received by the SBNC. Therefore, an effective method is desired for establishing an appropriate time period for filtering alarms.

SUMMARY OF THE INVENTION

Intelligent alarm filtering in a SONET or SDH subnetwork is simplified by a novel method and apparatus for identifying and suppressing cumulative alarm messages, requiring limited knowledge about the identity of NEs in the subnetwork and ports terminating inside and outside the subnetwork in order to establish alarm correlations. In a specific embodiment of the invention, upon the arrival of a first Directly Detected Failure Condition (DDFC) or Symptomatic Condition (SC) alarm message, a subnetwork controller (SBNC) collects and stores all subsequent alarm messages generated in the subnetwork during a prescribed time period. Once the prescribed time period ends, a subnetwork filter incorporated within the SBNC suppresses SC alarm messages collected during the correlation period that originate on ports terminating within the subnetwork, and reports all other alarms collected and stored during the prescribed time period. As a result of this method, redundant SC alarms are suppressed without any required overhead to trace them directly to DDFCs, and without substantially increasing the risk of suppressing a SC alarm associated with an otherwise unreported failure condition.

BRIEF DESCRIPTION OF THE DRAWING

A more complete understanding of the invention may be obtained by reading the following description of specific illustrative embodiments of the invention in conjunction with the appended drawing in which.

DETAILED DESCRIPTION

Figure 1:
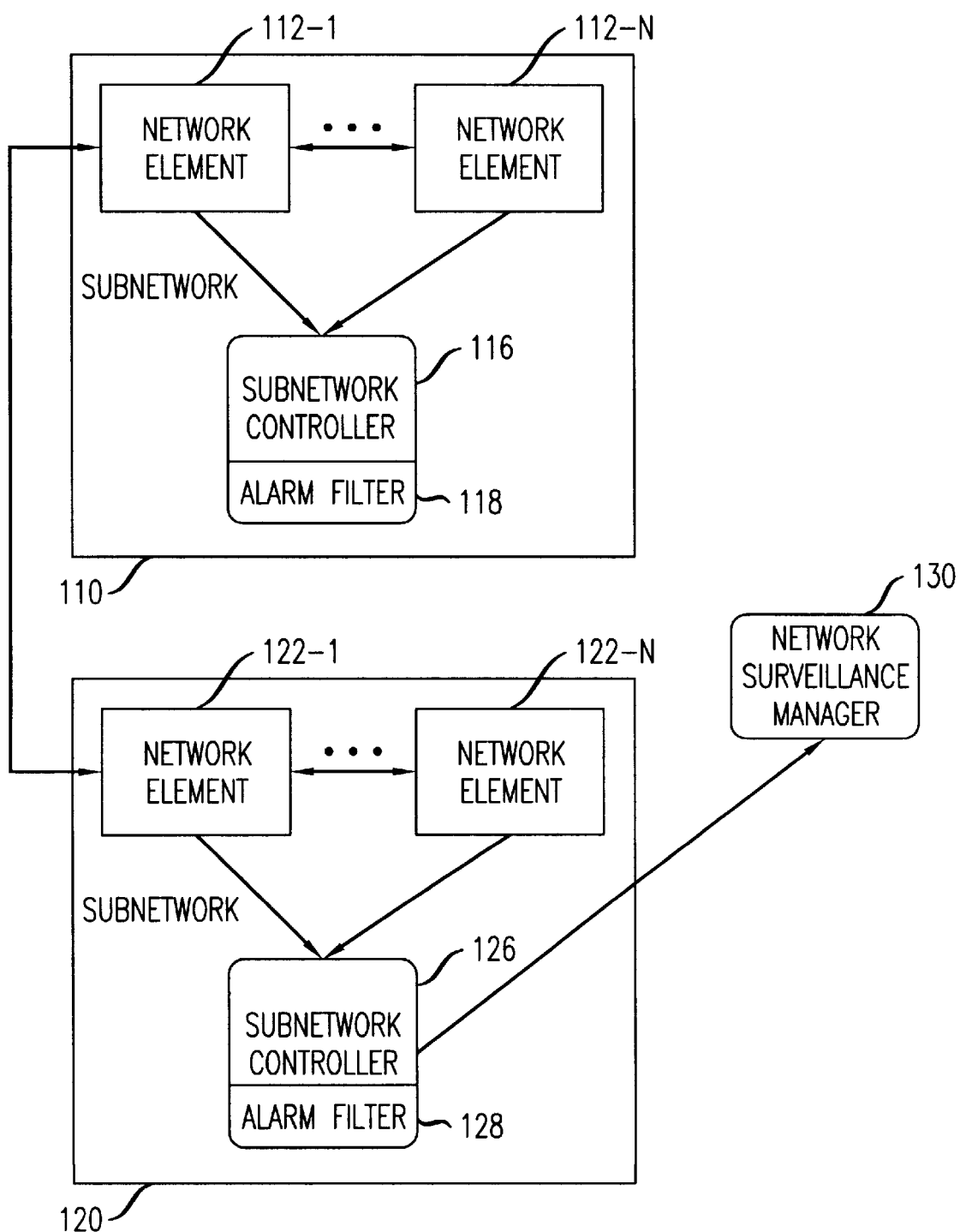
FIG. 1 provides a simplified block diagram of an alarm correlation domain within a Synchronous Optical Network (SONET) telecommunications network.

The present invention provides a method and apparatus for Intelligent Alarm Filtering (IAF) in a SONET or SDH subnetwork. The invention is based on a subnetwork filter implemented within the SBNC (as illustrated in FIG. 1, prior art alarm filters have been integrated within SBNCs such as Lucent Technologies' Integrated Transport Management Subnetwork Controller (ITM SNC). The novel method employed by this filter will become more apparent by way of the following examples.

Figure 2A:
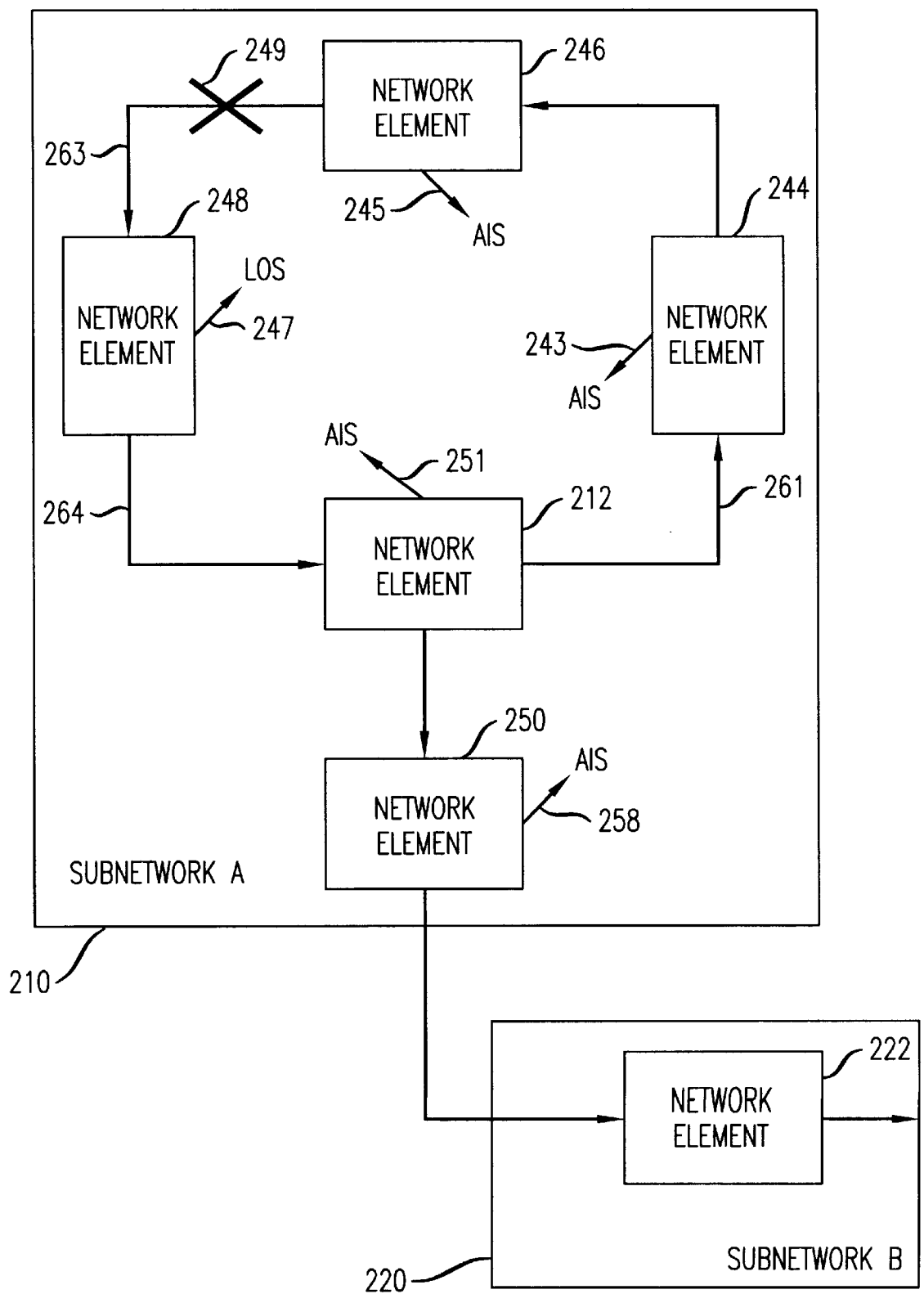
FIGS. 2 (a), (b), (c) and (d) illustrate typical alarms that are created, received and transmitted by a SONET network element.

FIG. 2(a) depicts a typical SONET subnetwork 210. The subnetwork includes NE's 212, 244, 246, and 248, interconnected in a ring configuration. In addition, NE 212 interconnects NE 250, which in turn is interconnected to a NE 222 in a subnetwork 220. A failure 249 at link 263 leads to the generation of a Loss Of Signal (LOS) alarm 247 by the NE 248. For the purposes of the following examples, LOS alarms will be used as an illustration for DDFC alarms.

The LOS alarm message 247 represents a DDFC at link 263, and is sent by the NE 248 to an SBNC associated with the subnetwork 210. Also, as an additional response to the failure, an Alarm Indication Signal (AIS) message, not shown, representing a Symptomatic Condition (SC), is sent by the NE 248 over a link 264 to the NE 212. For the purposes of the following examples, AIS alarms will be used as an illustration for SC alarms.

Upon receipt of this AIS message, the NE 212 sends an AIS message 251 to the SBNC associated with subnetwork 210, and also sends an AIS message (not shown) over the link 261 to the NE 244. This response cycle continues throughout the NE ring. As a result, the SBNC receives an AIS message 243 from the NE 244, an AIS message 245 from the NE 246, and an AIS message 258 from the NE 250.

In this example, while at least five alarm messages are provided by the subnetwork 210 to its SBNC, only the first LOS alarm 247 reported by the NE 248 is required trigger an appropriate maintenance activity. All of the reported AIS alarms may effectively be suppressed.

Figure 2B:
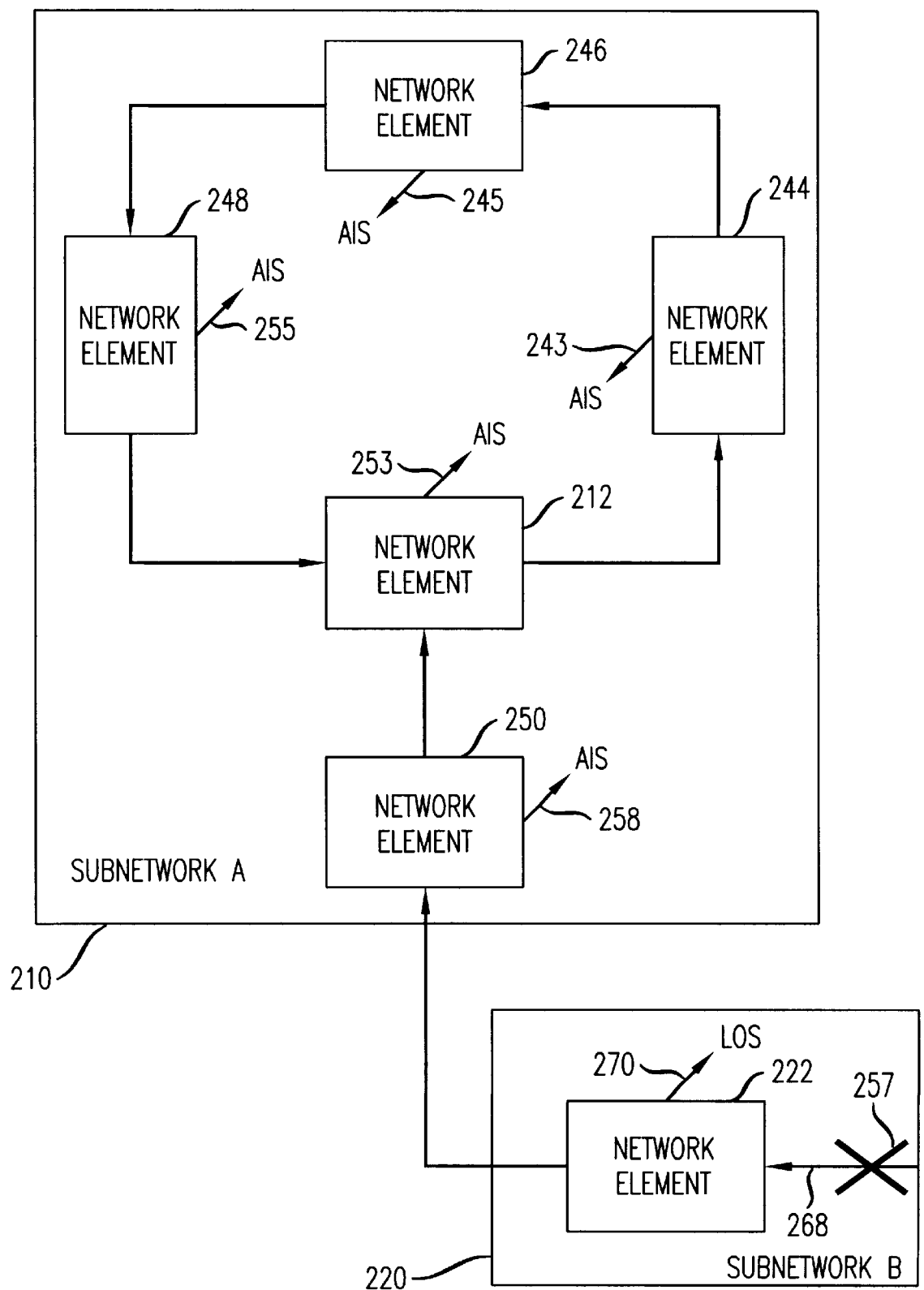

FIG. 2(b) depicts another alarm scenario for the subnetwork 210. A failure 257 in subnetwork 220 leads to the generation of a Loss Of Signal (LOS) alarm message 270 at a link 268. The LOS alarm message 270 is reported to the SBNC associated with the subnetwork 220 by the NE 222, which also sends an AIS message (not shown) downstream to the NE 250 in subnetwork 210. As a result, an AIS message 258 is sent to the SBNC associated with the subnetwork 210 by the NE 250. The NE 250 also sends an AIS message (not shown) to the NE 212, which in turn sends an AIS message 253 to the SBNC associated with subnetwork 210 and sends an AIS message (not shown) to the downstream NE 244. This response cycle continues throughout the NE ring. As a result, the SBNC associated with subnetwork 210 receives additional AIS messages 243, 245, and 255 from the NEs 244, 246, and 248, respectively.

Normally, the reporting of the LOS message 270 by NE 222 to an SBNC associated with the subnetwork 220 would be sufficient to trigger an appropriate maintenance action. However, if the SBNC associated with subnetwork 210 is operated independently of the SBNC of subnetwork 220 (for example, when each SBNC is not interconnected to a common NSM), the AIS message 258 generated by NE 250 is sufficient to indicate that a failure may have been experienced in the subnetwork 220.

Figure 2C:
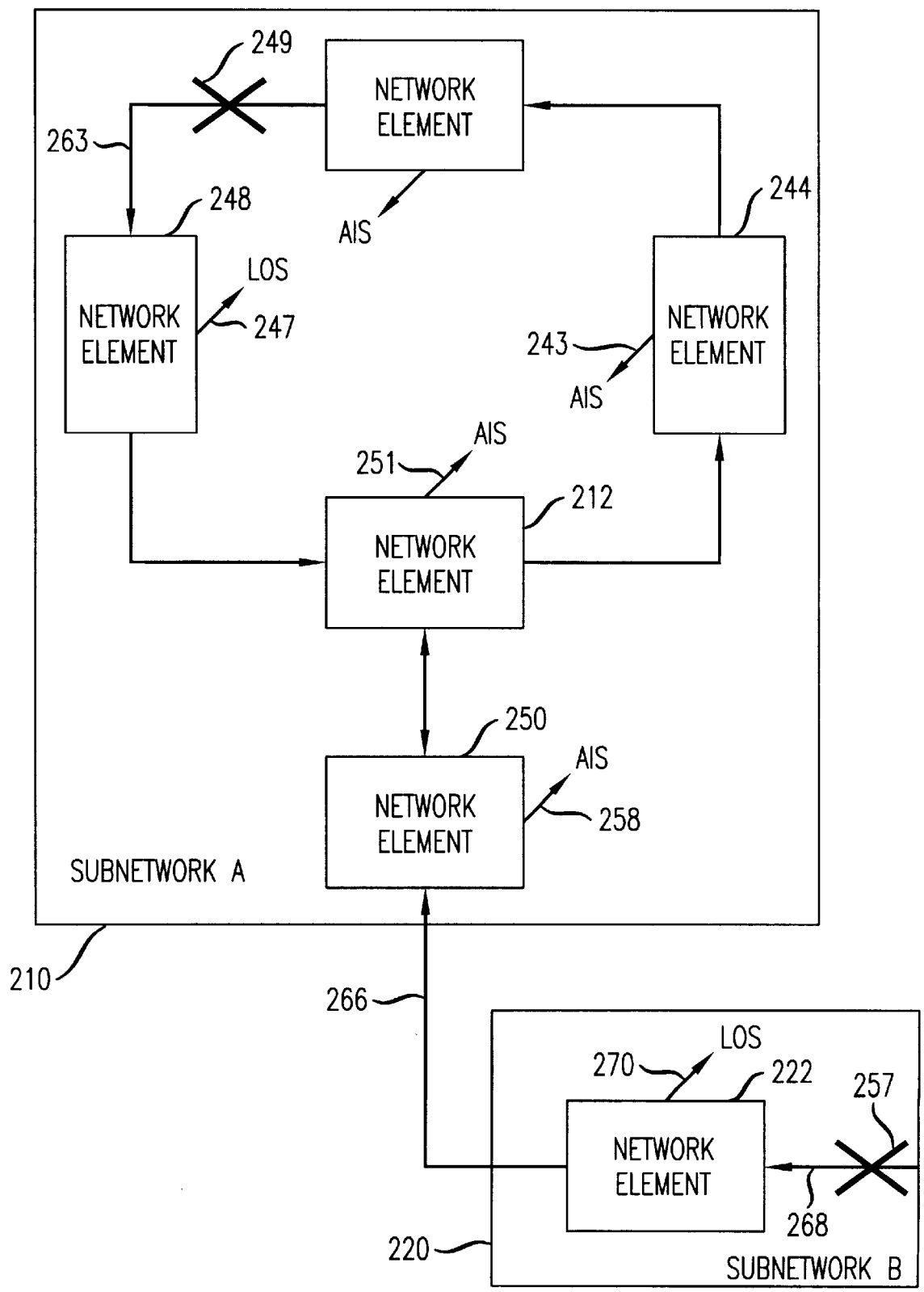

FIG. 2(c) depicts a third alarm scenario for the subnetwork 210. As in FIG. 2(a), a failure 249 at link 263 leads to the generation of a LOS alarm message 247 by the NE 248. The LOS alarm message 247 is sent by the NE 248 to the SBNC associated with the subnetwork 210. Once again, an AIS alarm message (not shown) is sent by the NE 248 over a link 264 to the NE 212. As a result, the NE 212 sends an AIS message 251 to the SBNC, and sends an AIS message (not shown) to the next downstream NE 244. As a result, the NE 244 sends an AIS message 243 to the SBNC associated with the subnetwork 210.

Also, as in FIG. 2(b), a failure 257 in subnetwork 220 of FIG. 2(c) leads to the generation of a LOS alarm message 270 at link 268. The LOS alarm message 270 is reported to the SBNC associated with the subnetwork 220 by the NE 222, which also sends an AIS message (not shown) downstream to the NE 250 in subnetwork 210. The NE 250 sends an AIS message 258 to the SBNC associated with the subnetwork 210, as well as an AIS message (not shown) to the NE 212.

The SBNC associated with subnetwork 210 provides two informative alarm messages to the NSM. First, it provides the LOS alarm message 247 to indicate the failure 249 within subnetwork 210. Secondly, it provides the AIS alarm 258 to indicate that a failure may also have occurred in subnetwork 220 (because the AIS message 258 is associated with link 266, which terminates both the NE 250 in subnetwork 210 and the NE 222 in subnetwork 220.). All other AIS messages can be suppressed without adversely impacting the initiation of maintenance actions necessary to correct the failures 249, 257.

Figure 2D:
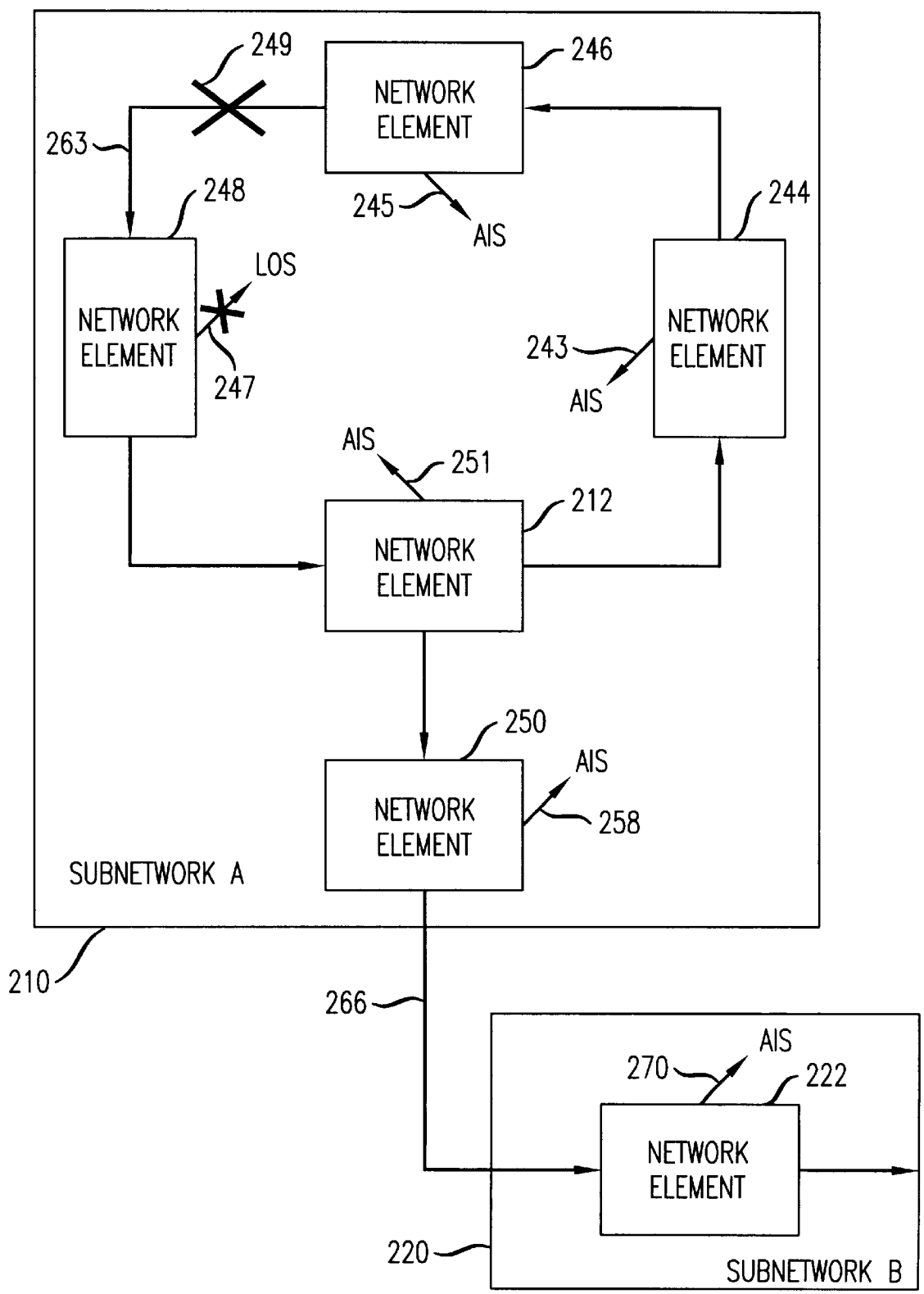

A fourth alarm scenario is depicted in FIG. 2(d). A failure 249 in subnetwork 210 leads to the generation of a LOS alarm message at link 263 by the NE 248. However, as depicted in FIG. 2(d), a failure at the NE 248 prevents the LOS alarm message 247 from being sent to the SBNC associated with the subnetwork 210. However, an AIS message (not shown) is successfully transmitted by the NE 248 to the NE 212, causing an AIS message 251 to be transmitted to the SBNC associated with the subnetwork 210, and an additional AIS message (not shown) to be sent to the NE 244. Following a similar course of events, AIS messages 243, 245 are sent to the SBNC associated with the subnetwork 210 by NEs 244, 246, respectively.

In addition, AIS messages (not shown) are sent by the NE 212 to the NE 250, and by NE 250 to NE 222. As a result, an AIS message 258 is sent by the NE 250 to the SBNC associated with the subnetwork 210, and an AIS message 270 is sent by the NE 222 to the SBNC associated with the subnetwork 220. Although the LOS alarm message 247 fails to reach the SBNC associated with the subnetwork 210, AIS alarm messages received by the SBNC associated with subnetwork 210 and the SBNC associated with subnetwork 220 are sufficient to infer the need for a maintenance action within subnetwork 210.

First, because no concurrent DDFC message is received by the SBNC associated with subnetwork 210, the AIS messages 251, 243 and 245 are not suppressed by the SBNC associated with subnetwork 210. Additionally, the AIS message 270 is received by the subnetwork 220 SBNC from a port on the link 266 (since the link 266 terminates in subnetwork 210 as well as subnetwork 220). The unexplained AIS alarm messages 251, 243 and 245 reported by subnetwork 210 viewed together with the AIS alarm message 270 (associated with a link to subnetwork 210) reported by the subnetwork 220 point heavily towards a failure originating in the subnetwork 210.

Consistent with the schemes outlined above in FIGS. 2(a), (b), (c) and (d), the present invention provides a method for suppressing SC alarm messages that are unnecessary to the diagnosis of failures within an associated subnetwork. In summary, this method involves the following steps. Upon the arrival of a first DDFC or SC alarm, a subnetwork controller (SBNC) collects all subsequent alarm messages generated in the subnetwork during a correlation period. The correlation period persists for no more than a maximum specified time period, and only as long as subnetwork alarms continue to be generated. Once the correlation period ends, if a DDFC alarm message has been reported, a subnetwork filter incorporated within the SBNC suppresses SC alarm messages collected during the correlation period that originate on ports terminating within the subnetwork, and reports all other alarm messages collected during the correlation period. As a result of this method, redundant SC alarm messages are suppressed without any overhead being required to trace them directly to associated DDFC's, and without substantially increasing the risk of suppressing a SC alarm message associated with an otherwise unreported failure condition.

The benefits provided by the present invention over the prior art (alarm tracing) are substantial. Unlike the alarm tracing method, the present invention does not require real-time information about communications path cross-connect connectivity for each of the NEs in a subnetwork. Rather, it simply requires identifying which NEs are associated with a subnetwork, identifying any subnetwork links that terminate in other subnetworks, and tracking network signal levels associated with each alarm. A significant amount of overhead is saved over the alarm tracing method, while the ability to filter out redundant alarm messages is largely preserved.

Figure 3:
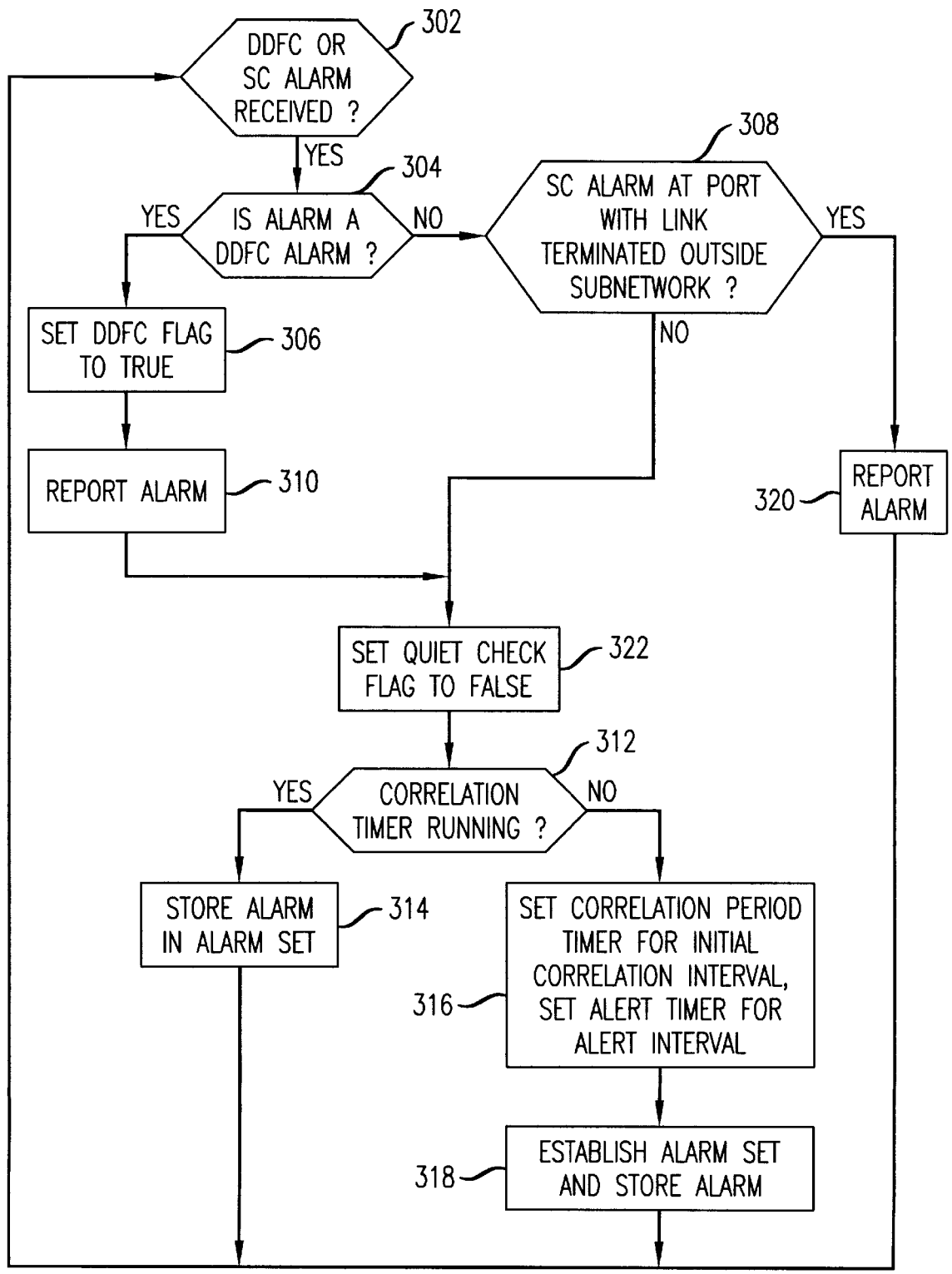
FIG. 3 provides a flowchart illustrating a method for responding to a directly detected failure alarm.

FIGS. 3 through 6 illustrate the operation of the present invention. FIG. 3 provides a flow diagram depicting how alarms are logged during the correlation period. In step 302, a subnetwork filter receives either a DDFC or SC alarm message from a NE in an associated subnetwork. In step 304, the filter determines whether the alarm message represents a DDFC alarm. If not, in step 308, the filter determines whether the alarm is a SC alarm from a NE port associated with a link terminated outside the subnetwork. If so, the alarm message is reported in step 320 and the filter waits to receive a next alarm message.

If the alarm is associated with a DDFC, in step 306, a DDFC flag is set to a value of true and is reported to the SBNC in step 310. If the alarm is either a DDFC alarm or a SC alarm associated with a NE port terminated within the subnetwork, a quiet check flag is set to false in step 322. In step 312, the filter determines whether a correlation timer is running. If the timer is running, in step 314, a representation of the alarm is stored in a correlation set. If the timer is not running, it is set to run for an initial correlation interval in step 316. In step 316, an alert timer is also set to run for an alert interval.

After the timers and quiet check flag have been set, an alarm set is established and the alarm message is logged in step 318 of FIG. 3. Once the alarm message has been stored either in step 314 or 318, the process exits and waits until a next alarm message is received.

Figure 4:
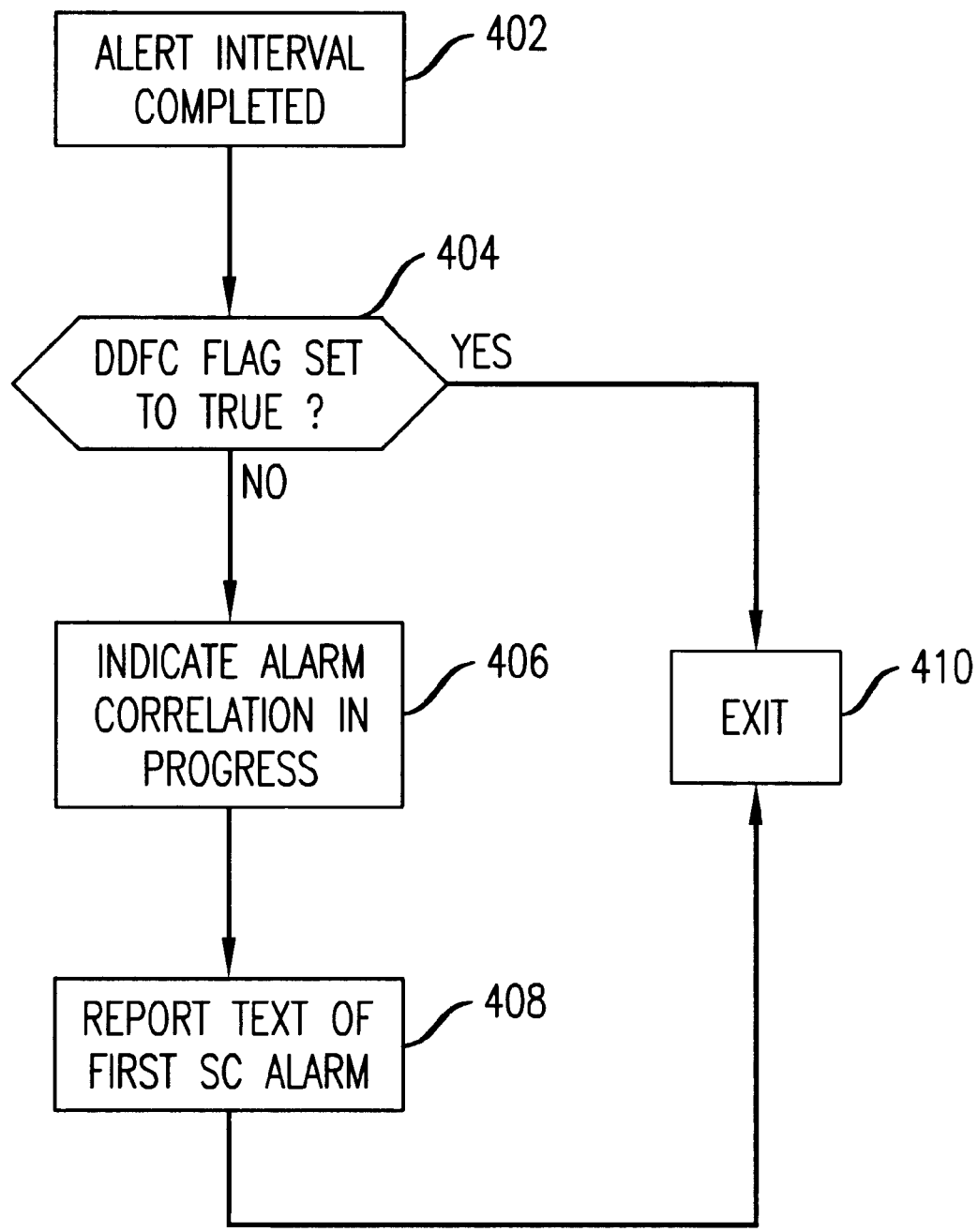
FIG. 4 provides a flowchart illustrating a method for responding to a symptomatic failure alarm.

FIG. 4 depicts the alert interval completion process. The purpose of this process is to provide an early indication of a possible subnetwork failure on the basis of SC alarm messages received in the subnetwork in advance of any DDFC alarm messages (which may be likely under certain alarm storm conditions). The alert interval expires in step 402, before the expiration of the correlation interval. In step 404, the filter determines whether the DDFC flag has been set to a value of true, and thereby, whether a DDFC alarm message has been logged and reported. If not, in step 406, the filter reports that an alarm correlation process is underway, and in step 408, reports information indicative of the first logged SC alarm message. After either determining that a DDFC alarm message has been logged in step 404 or reporting a information indicative of a first SC alarm message in step 408, the process exits in step 410.

Figure 5:
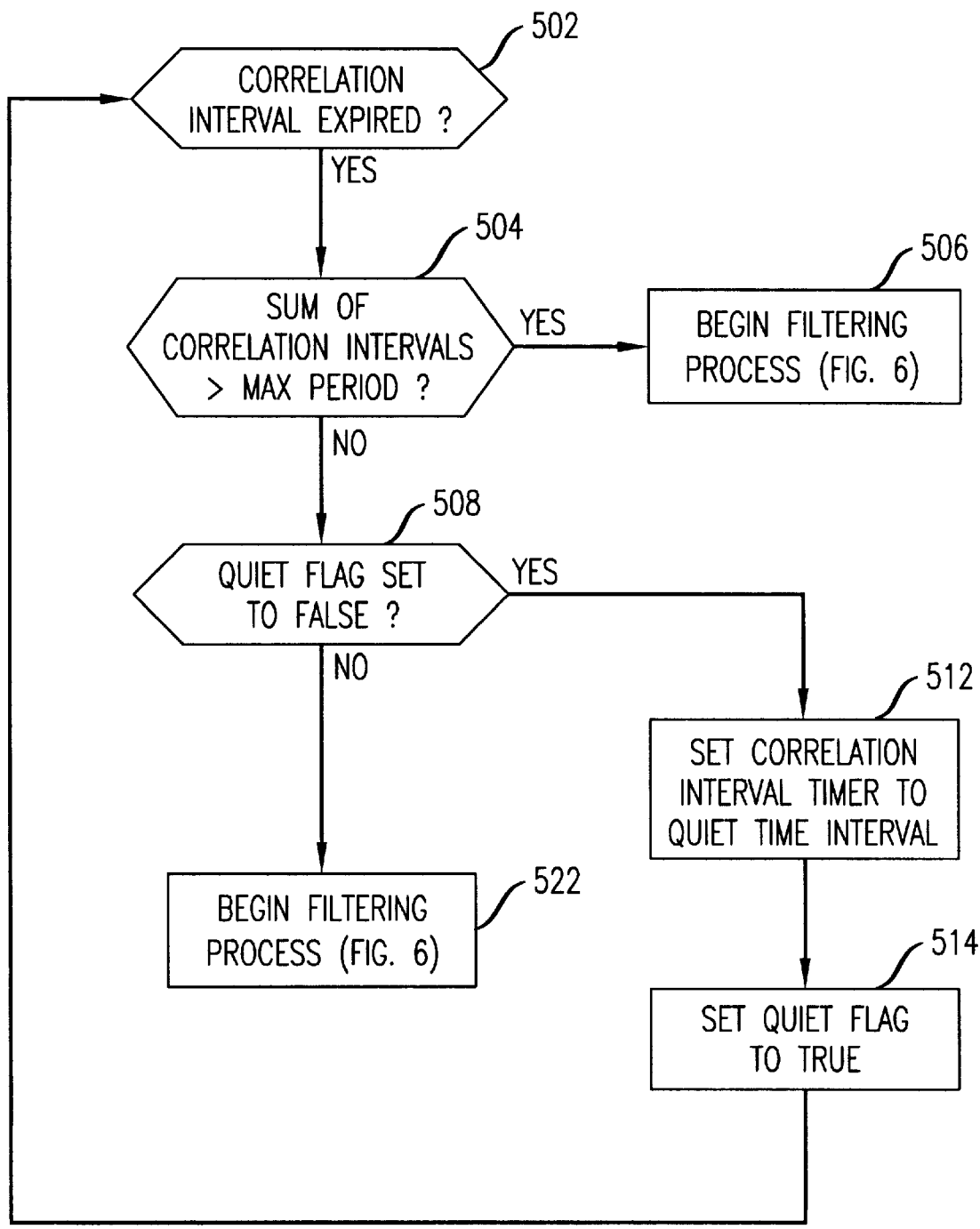
FIG. 5 provides a flowchart illustrating a method for establishing a correlation period over which symptomatic failure alarms will be filtered.

FIG. 5 depicts the process used to build the correlation period. The process begins after an initial correlation interval has expired in step 502. The SC filter then determines whether this initial correlation interval exceeds a maximum correlation period in step 504. The lengths of the correlation intervals and maximum correlation period may be established heuristically, based on the number and types of NEs supported within the subnetwork, and on the data transmission rates between the NEs and the SBNC.

Figure 6:
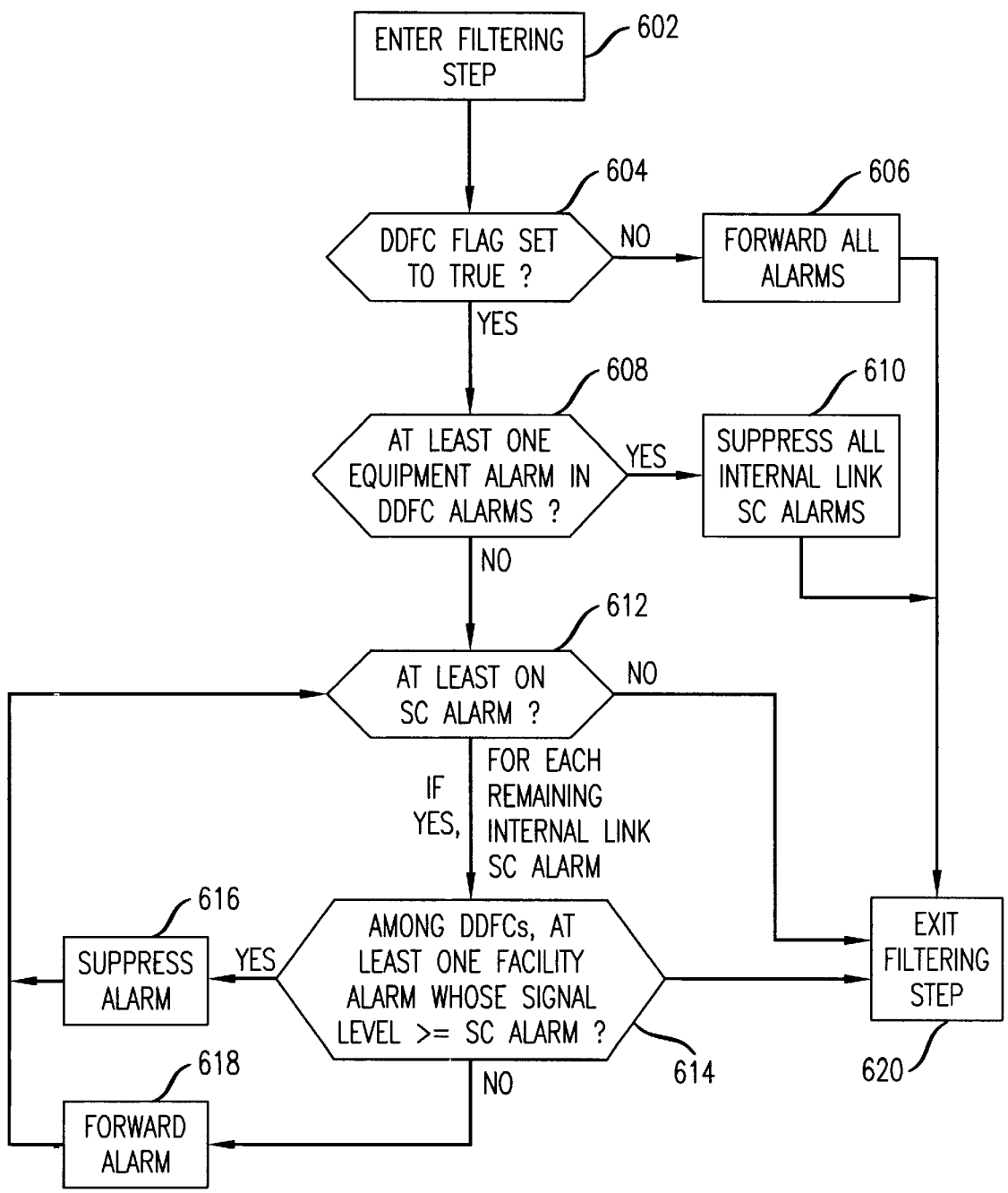
FIG. 6 provides a flowchart illustrating a method for filtering redundant SC alarms.

If correlation intervals have accrued so that the maximum period has been exceeded, in step 506, the correlation period ends and the filtering process of FIG. 6 begins. If the maximum period has not been exceeded, in step 508, the SC filter determines whether the quiet check flag has been set to a value of false. A value of false implies that alarm messages were logged during the previous correlation interval. If the quiet flag has a value of false, the correlation timer is reset for another "quiet time" interval in step 512, the quiet check flag is set to true in step 514, and the process waits for the completion of a next correlation interval before repeating steps 502 through 508. If, in step 508, the quiet check flag is set to true, it is determined that no alarms were logged during the just-ended quiet time interval, the correlation period ends, and the filtering process of FIG. 6 begins in step 522.

FIG. 6 depicts the filtering process that occurs at the conclusion of the correlation interval. After beginning the process in step 602, in step 604 the filter checks whether the DDFC flag is set to true to indicate that at least one of the logged alarm messages is associated with a DDFC. If no DDFC alarm messages were logged, the filter reports all logged alarm messages in step 606, and exits the process in step 620.

If at least one DDFC alarm message is logged, the filter determines in step 608 whether at least one of the logged DDFC alarms is an equipment alarm. If at least one equipment alarm is logged, in step 610, the filter suppresses any logged SC alarm messages from ports associated with links terminated within the subnetwork, and exits the process in step 620. Otherwise, in step 612, the filter determines whether any SC alarms have been logged that require disposition. In step 614, for each logged SC alarm, the filter determines whether there is at least one facility DDFC alarm whose signal level is greater than or equal to the signal level for the SC alarm.

If a DDFC alarm is greater than or equal in level to a SC alarm, the SC alarm may be assumed to be a consequence of the DDFC alarm. Accordingly, the associated alarm message may be suppressed in step 616. For example, a DDFC alarm may be associated with a SONET OC48 signal and a SC alarm may be associated with a SONET OC 3 signal that is a tributary of the OC 48 signal. Under these circumstances, the SC alarm may be assumed to be related to the DDFC alarm, as it is more likely than not that the tributary has been affected by the parent signal. On the other hand, if the DDFC alarm is associated with an OC3 signal and the SC alarm is associated with an OC48 signal, the SC alarm may not be assumed to be related to the DDFC alarm associated with the lower-level OC3 signal.

Accordingly, if no DDFC alarm is at a higher signal level that the SC alarm, the SC alarm message is forwarded to the SBNC in step 618. Once this process has proceeded to the point that no additional logged SC alarm messages remain to be disposed per step 612, the process exits in step 620.

The exemplary embodiment described above is but one of a number of alternative embodiments of the invention that will be apparent to those skilled in the art in view of the foregoing description. Accordingly, this description is to be construed as illustrative only, and is for the purpose of teaching those skilled in the art the best mode of carrying out the invention. Various other alternatives can be devised by a worker skilled in the art without departing from the teachings of this invention. For example, the alarm logging process of FIG. 3 can be easily extended to manage multiple filtering processes associated with independent SONET or SDH subnetworks (in the case, for example, when multiple subnetworks report alarms to a single SBNC). Additionally, for example, the suppression scheme can be easily extended to incorporate other known suppression strategies (for example, alarm aging), and applied to networks supporting other transport technologies.

I claim:

1. A method for filtering alarms generated in a telecommunications network, said method comprising the steps of:
    detecting initially the arrival of a directly detected failure condition alarm or a symptomatic condition alarm;
    collecting and storing alarms generated within the network for a prescribed time period after the initial alarm detection; and
    reporting at the conclusion of the prescribed time period all stored alarms other than symptomatic condition alarms originating on ports connected to links fully terminated within the network.

2. The method of claim 1, wherein each directly detected failure condition alarm is selected from the group consisting of loss of signal, loss of frame, out of frame, loss of pointer, signal label mismatch, synchronization failure, data communications channel failure, protection switching failure and equipment failure alarms.

3. The method of claim 1, wherein each symptomatic condition alarm is selected from the group consisting of alarm indication signal, remote failure indication, performance monitoring threshold crossing alert and successful protection switching completion alarms.

4. The method of claim 1, wherein the prescribed time interval is a correlation interval.

5. A method for filtering alarms generated in a telecommunications network, said method comprising the steps of:
    collecting and storing alarms generated within the network for a prescribed time period;
    when at least one of the stored alarms represents a directly detected equipment failure condition, suppressing each symptomatic condition alarm that originated at a port connected to a link fully terminated within the network; and
    when at least one of the stored alarms represents a directly detected failure condition and none of the stored alarms represents a directly detected equipment failure condition, suppressing each symptomatic condition alarm that originated at a port connected to a link fully terminated within the network, when said symptomatic condition alarm is at a lower signal level than said at least one directly detected failure condition alarm.

6. The method of claim 5, further comprising the step of reporting all alarms stored within the prescribed time period that are not suppressed.

7. The method of claim 5, wherein each directly detected failure condition alarm is selected from the group consisting of loss of signal, loss of frame, out of frame, loss of pointer, signal label mismatch, synchronization failure, data communications channel failure, protection switching failure and equipment failure alarms.

8. The method of claim 5, wherein each symptomatic condition alarm is selected from the group consisting of alarm indication signal, remote failure indication, performance monitoring threshold crossing alert and successful protection switching completion alarms.

9. The method of claim 5, wherein the prescribed time period is a correlation period.

10. A method for establishing a period for correlating alarms detected within a telecommunications network, said method comprising the steps of:
    initiating the correlation period with the detection of a first alarm;
    detecting alarms generated subsequent to said first alarm over a first prescribed incremental time interval; and
    accumulating the first prescribed time interval and subsequent prescribed incremental time intervals to define the correlation period, so long as one or more alarms are detected during each of said prescribed time intervals and a predefined maximum correlation period is not exceeded by the accumulated intervals.

11. The method of claim 10, wherein each detected alarm represents either a directly detected failure condition or a symptomatic condition.

12. A system for filtering alarms generated in a telecommunications network, said system comprising:

a network controller interconnected with one or more elements in the network, wherein said network controller receives and stores alarms generated by said one or more network elements for a prescribed time period; and an alarm filter, wherein said alarm filter is responsive to the network controller for determining whether at least one of the stored alarms is of a first type; and when at least one of the stored alarms is of said first alarm type, selectively suppressing each stored alarm of a second alarm type, wherein said second alarm type includes alarms originating at ports connected to links fully terminated within the network that indicate symptomatic conditions.

13. The system of claim 12, wherein said first alarm type includes alarms for directly detected failure conditions.

14. The system of claim 12, wherein said filter further comprises means for reporting all alarms stored within the prescribed time period that are not suppressed.

15. The system of claim 12, wherein the prescribed time period is a correlation period.

16. A method for filtering alarms generated in a telecommunications network, said method comprising the steps of:

collecting and storing alarms generated within the network for a prescribed time period; and when at least one of the stored alarms is of a first alarm type, selectively suppressing each stored alarm of a second alarm type, wherein said second alarm type includes alarms originating at ports connected to links fully terminated within the network that indicate symptomatic conditions.

17. The method of claim 16, wherein said first alarm type includes alarms for directly detected failure conditions.

18. The method of claim 17, wherein each directly detected failure condition alarm is selected from the group consisting of loss of signal, loss of frame, out of frame, loss of pointer, signal label mismatch, synchronization failure, data communications channel failure, protection switching failure and equipment failure alarms.

19. The method of claim 16, wherein each symptomatic condition alarm is selected from the group consisting of alarm indication signal, remote failure indication, performance monitoring threshold crossing alert and successful protection switching completion alarms.

20. The method of claim 16, further comprising the step of reporting all alarms stored within the prescribed time period that are not selectively suppressed.

21. The method of claim 16, wherein the prescribed time period is a correlation period.

* * * * *